US007995277B2

(12) United States Patent
Patterson

(10) Patent No.: US 7,995,277 B2

(45) Date of Patent: Aug. 9, 2011

(54) APPARATUS FOR CONTROLLING ENERGY THROUGH A SKYLIGHT

(75) Inventor: James R. Patterson, Norman, OK (US)

(73) Assignee: The Board of Regents of the University of Oklahoma, Norman, OK (US)

(*) Notice: Subject to any disclaimer, the term of this patent is extended or adjusted under 35 U.S.C. 154(b) by 398 days.

(21) Appl. No.: 12/103,776

(22) Filed: Apr. 16, 2008

(65) Prior Publication Data

US 2008/0250735 A1 Oct. 16, 2008

Related U.S. Application Data

(60) Provisional application No. 60/923,621, filed on Apr. 16, 2007.

(51) Int. Cl.
*G02B 17/00* (2006.01)

(52) U.S. Cl. ........................................ 359/591; 596/597

(58) Field of Classification Search .......... 359/591–592, 359/597, 596; 160/107; 52/200
See application file for complete search history.

(56) References Cited

U.S. PATENT DOCUMENTS

| | | | | |
|---|---|---|---|---|
| 285,625 | A * | 9/1883 | Hyatt | 359/597 |
| 550,376 | A * | 11/1895 | Lugrin | 359/597 |
| 3,722,572 | A | 3/1973 | Hall | |
| 4,427,048 | A | 1/1984 | Osaka et al. | |
| 4,505,069 | A | 3/1985 | Freeman | |
| 5,675,487 | A | 10/1997 | Patterson et al. | |
| 6,484,786 | B1 | 11/2002 | Ruggles et al. | |

OTHER PUBLICATIONS

International Search Report dated Aug. 15, 2008.

* cited by examiner

*Primary Examiner* — Christopher Mahoney

(74) *Attorney, Agent, or Firm* — Dunlap Codding, P.C.

(57) ABSTRACT

An apparatus for controlling energy from a skylight of a structure including a plurality of vanes positioned beneath the skylight and angularly adjustable to control solar radiation entering the structure through the skylight. The vanes are substantially S-shaped. A first light sensor is disposed proximate the skylight side of the vanes for providing a signal over time representative of changing incident solar radiation at the skylight side of the vanes, and a second light sensor disposed proximate the structure side the vanes for providing a signal over time representative of changing incident solar radiation at the structure side of the vanes. A control assembly is operably connected to the vanes for automatically controlling the angle of each of the vanes in response to the signals of the first and second light sensors which signals vary due to changes in incident solar radiation over time. A light deflecting member is positioned below the vanes a selected distance so as to cause a first portion of the light that passes through the vanes to be reflected toward the ceiling of the structure and a second portion of the light to pass directly toward the floor of the structure.

18 Claims, 4 Drawing Sheets

APPARATUS FOR CONTROLLING ENERGY THROUGH A SKYLIGHT

CROSS REFERENCE TO RELATED APPLICATIONS

This application claims benefit of U.S. Provisional Application No. 60/923,621, filed Apr. 16, 2007, which is incorporated herein by reference in its entirety.

BACKGROUND OF THE INVENTION

1. Field of the Invention

The present invention relates generally to a light control apparatus, and more particularly, but not by way of limitation, to an apparatus for a skylight that uses solar radiation as the control parameter and as the power source for automatic adjustment of shade devices to control solar energy entering a structure through the skylight.

2. Brief Description of Related Art

Skylights were widely used to provide light to industrial and warehouse buildings before the widespread use of fluorescent lighting. Around 1995, "big box" retailers began to install skylights over product sales areas. The original objective was to improve the appearance of products by admitting daylight. Natural light has a color rendition index (CRI) of 100%. Thus, products were more appealing than when viewed under the weak fluorescent or high intensity discharge lighting then in use with CRI's of around 40-60%. In addition, natural light reduces the cost of artificial lighting, which accounts for 40% to 50% of the energy consumption in many commercial buildings. When sufficient natural light or daylight is available, a good daylighting system can significantly reduce artificial lighting requirements and the associated energy costs.

While skylights perform well in both improving the quality of store lighting and reducing the need for artificial lighting, they have a significant disadvantage. Daylighting is composed of the visible light spectrum plus direct solar gain. Direct solar gain increases air-conditioning loads resulting in increased utility costs.

The skylight industry does not have any advanced technology in the control of solar loading. The approaches used so far include adding tint to the skylight and thereby increase the shading coefficient. The problem with this solution is that it, in turn, decreases the light admitted into the structure. The window industry has also responded to government insistence in the form of low-e glazings and thermal blocking frames.

Technologies to provide active control, such as electrochromic glazing (ECG), which has been in development for the past ten years and still not available to the mass market, are extremely expensive. While ECG will limit solar heat gain through windows it still will not optimize daylighting. Further, it offers no solution to the retro-fit market, nor does it offer any fire resistance.

To this end, a need exists for an apparatus for controlling solar energy entering a structure through a skylight which uses solar radiation as the control parameter. It is to such an apparatus and method that the present invention is directed.

DETAILED DESCRIPTION OF EXEMPLARY EMBODIMENTS

Figure 1:
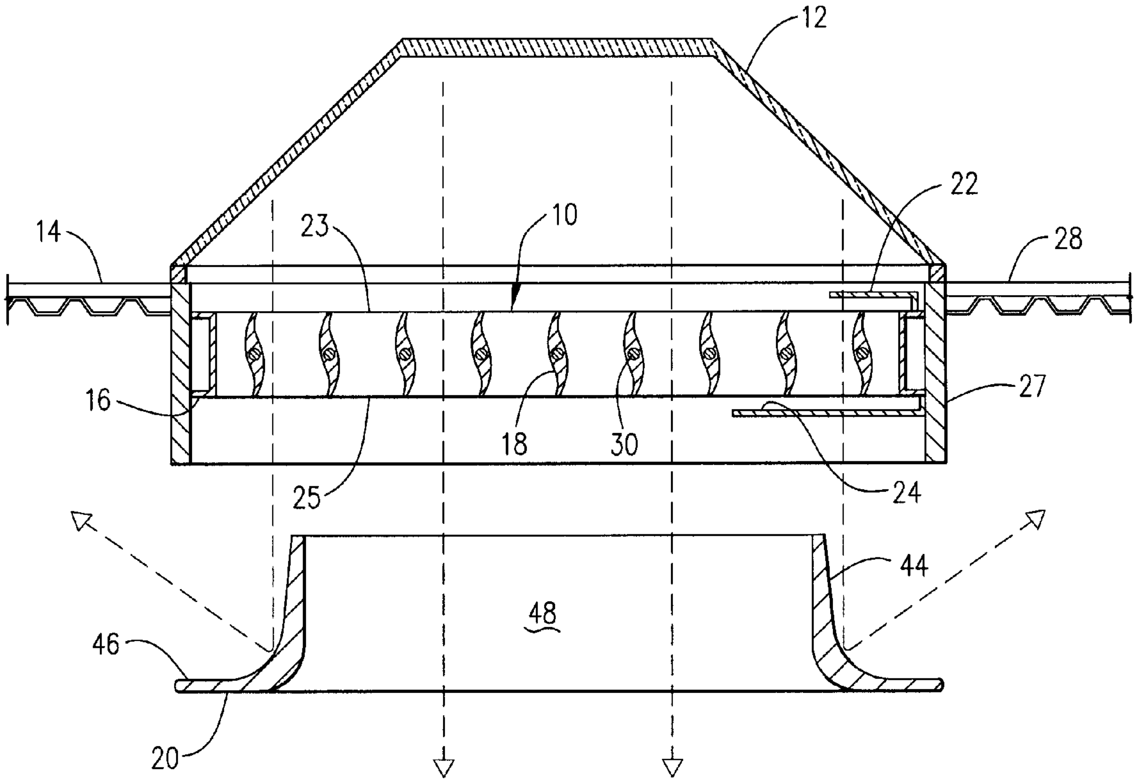
FIG. 1 is a sectional view of an energy control apparatus shown installed below a skylight of a structure.

Referring to the drawings in detail, and particularly to FIG. 1, an energy control apparatus 10 is shown installed beneath a skylight 12 of a structure 14, such as a building. The energy control apparatus 10 is used to control the amount of solar energy entering the structure 14 through the skylight 12.

Figure 2:
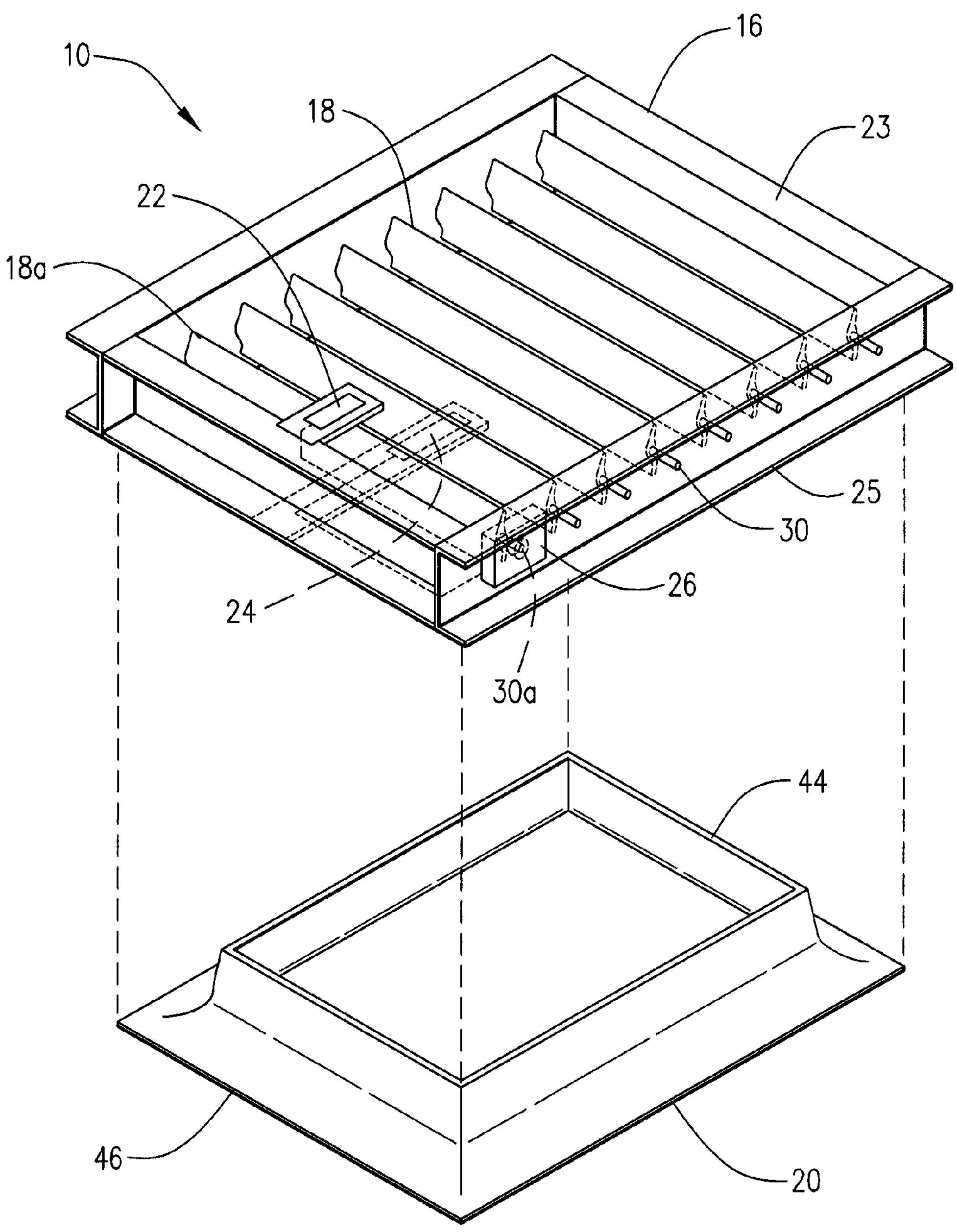
FIG. 2 is an exploded, perspective view of the energy control apparatus constructed in accordance with the present invention.

Referring to FIGS. 1 and 2, the energy control apparatus 10 broadly includes a vane support frame 16, a plurality of vanes 18 rotatably attached to the vane support frame 16, a light deflecting member 20 positioned beneath the vane support frame 16, a first light sensor 22 supported on a skylight side 23 of the vane support frame 16, a second light sensor 24 supported on a structure side 25 of the vane support frame 16, and a control assembly 26. The control assembly 26 is adapted to receive input signals from the first and second light sensors 22 and 24 and then rotatably position the vanes 18 within the vane support frame 16 to control the amount of solar energy entering the structure 14.

The skylight 12 shown in FIG. 1 is a conventional skylight that is dome-shaped to extend above the structure 14 and to admit light into the structure 14. The skylight 12 may be formed in a variety of shapes and constructed of a variety of translucent or transparent materials designed to admit light. The skylight 12 is shown in FIG. 1 as being mounted to a curb 27 in a conventional manner. However, it should be appreciated that the skylight 12 may be mounted to the structure 14 in a variety of ways.

As shown in FIG. 1, the vane support frame 16 is positioned in, and secured to, the curb 27 so that the energy control apparatus 10 is positioned beneath the skylight 12. However, it will be appreciated that the vane support frame 16 may be supported by the underside of the roof 28, or ceiling, of the structure 14. The vane support frame 16 is constructed of a rigid material, such as steel, aluminum, or plastic, so as to be adapted to support the vanes 18 and permit the vanes 18 to be rotated. The vane support frame 16 can be sized and shaped so as to match any opening size or shape in the roof 28 of the structure 14. In one embodiment, the vane support frame 16 may be provided with a first pane (not shown) and a second pane (also not shown) made of a transparent material to provide additional insulation properties. The first pane may be positioned over the skylight side 23 of the vane support frame 16 and can be secured to the vane support frame 16 in any suitable manner. The second pane may be secured to the vane support frame 16 over the structure side 25 and can also be secured in any suitable manner. In an alternative embodiment, only the first pane may be secured to the vane support frame 16 so as to function as a skylight as an alternative to employing the skylight 12 of the structure 14.

The vanes 18 are positioned in the vane support frame 16 so as to allow the vanes 18 to rotate or pivot. Each of the vanes 18 is supported in the vane support frame 16 by a shaft 30 so that the vanes 18 can rotate or pivot in a clockwise direction and a counter clockwise direction. The vanes 18 can rotate or pivot clockwise from a first substantially closed position, where the vanes 18 are substantially horizontally disposed, to a maximumly open position, where the vanes 18 are substantially vertically disposed, as shown in FIG. 1. From the maximumly open position, the vanes 18 can further rotate or pivot clockwise to a second substantially closed position, where the vanes 18 are substantially horizontally disposed.

Figure 3:
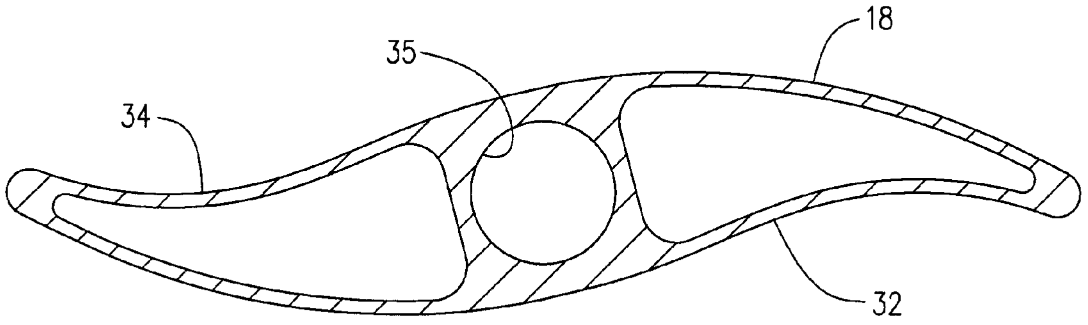
FIG. 3 is sectional view of a vane of the energy control apparatus.

Referring now to FIG. 3, the vanes 18 are sized and shaped to allow for the passage of as much light (indirect light) as possible through the vanes 18 and into the structure 14 while at the same time blocking solar radiation (direct light). In a preferred embodiment, the vanes 18 have a substantially S-shape. More specifically, the substantially S-shaped vanes 18 have a first curved portion 32 and a second curved portion 34 which is symmetrical with respect to the first curved portion 32. Each of the curved portions 32 and 34 have a substantially scimitar shape to maximize light passage while still blocking direct gain and to focus and reflect light into the structure 14 even when the vanes 18 are nearly in the substantially closed position. The vanes 18 are provided with a bore 35 for receiving the shaft 30. In one embodiment, the vanes 18 each have a width of about 8.5 inches and a length sufficient to extend across the width of the vane support frame 16. The vanes 18 are spaced to overlap in the closed position. The vanes 18 are preferably constructed of a fire retardant material so that the energy control apparatus 10 may function as a thermal barrier to the skylight 12 in the case of a fire in the structure 14. The energy control apparatus 10 may prevent the skylights 12 from melting and creating an opening into the structure 14 which would provide a source of fuel for a fire. The vanes 18 also have a strength sufficient to meet certain code requirements for supportive strength. In one preferred embodiment, the vanes 18 may be constructed of a fiber reinforced plastic.

The vanes 18 are rotatably positioned by the control assembly 26 (FIG. 2). The vanes 18 are constructed to be positioned automatically in response to changes in incident solar radiation over time. To this end, conventional control systems are utilized to position the vanes 18. The control assembly 26 of the energy control apparatus 10 employs sensing electronics, a logical processing device, such as a microprocessor digital signal processor or a micro-controller, and a force generating device for positioning the vanes 18, such as a motor (analog or stepper) or a solenoid. FIG. 2 illustrates a servomechanism as being one example of a suitable control assembly. Another example of a suitable control assembly and the use of same is described in U.S. Pat. No. 5,675,487, issued Oct. 7, 1997, the contents of which are expressly incorporated herein by reference. Servomechanisms, motors, solenoids, and controllers constructed to operate in the manner described herein are well known in the art. Thus, a detailed description of such components is not believed necessary to enable one skilled in the art to understand the operation of the energy control apparatus 10 of the present invention.

The force generating device, such as a servomechanism, motor, or solenoid, of the control assembly 26 is operably connected to the shaft 30 of one of the vanes 18, as shown in FIG. 2. The force generating device is operably connected to the vanes 18 to adjust the angle thereof. The force generating device is preferably mounted to the vane support frame 16 between the skylight side 23 and the structure side 25 of the vane support frame 16. However, the force generating device can be located at other positions so long as there is a drive connection between the force generating device and one or more of the vanes 18 such that the angle of the vanes 10 can be varied to control solar radiation entering the structure 14 via the skylight 12.

Figure 4:
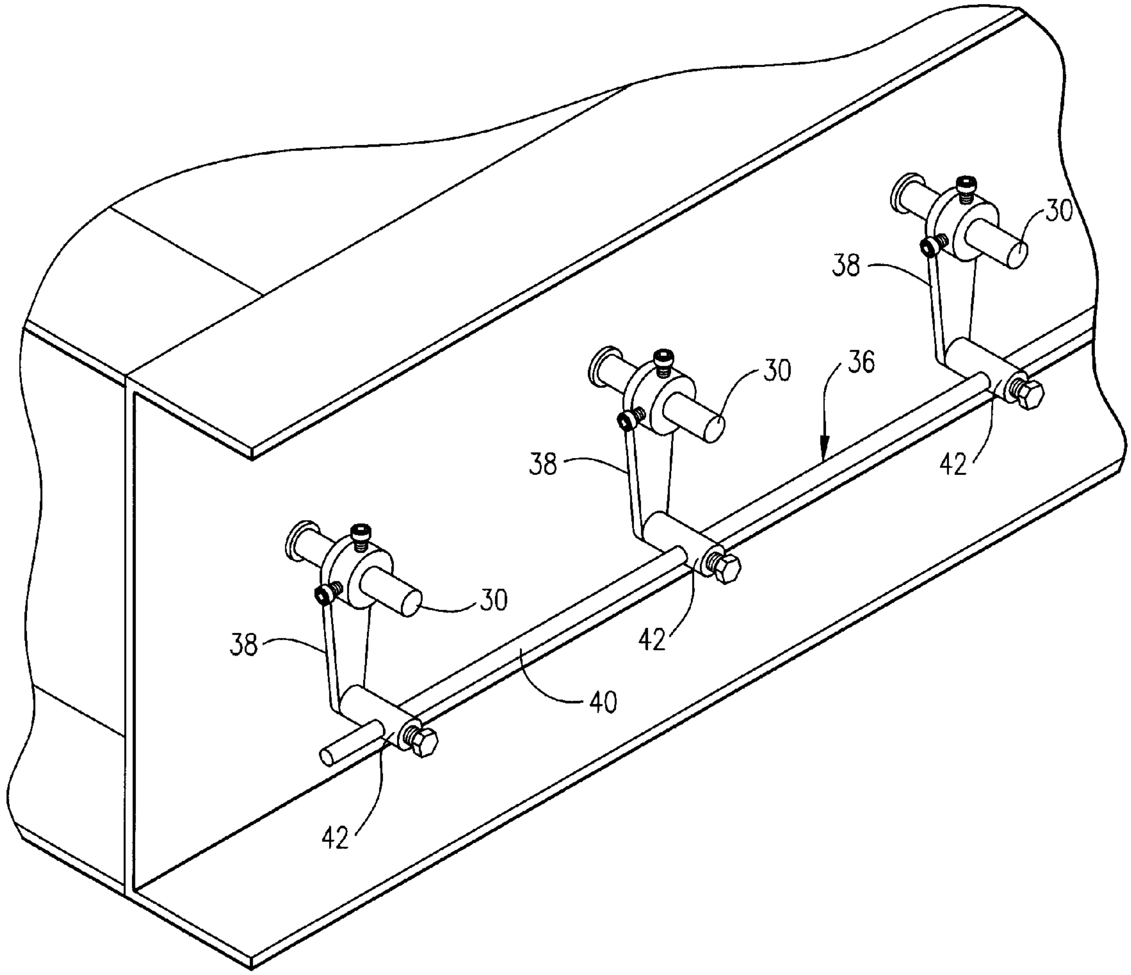
FIG. 4 is a perspective view of a portion of the energy control apparatus illustrating a vane linkage assembly.

In FIG. 2, the force generating device is operably connected to the shaft **30*a* of the vane 18*a* so as to rotate the shaft 30*a* and the vane 18*a* in angular increments, although the force generating device may alternatively be connected to any of the other vanes 18. Rotation of the shaft 30*a* will cause rotation of all the vanes 18 in unison as a result of the vanes 18 being interconnected by a linkage assembly 36, as illustrated in FIG. 4, which interconnects each of the vanes 18 with one another. The linkage assembly 36 includes a plurality of arms 38 extending radially from each of the shafts 30 and a linkage rod 40 pivotally connected to each of the arms 38 by a pivot connector 42. While a preferred embodiment of the linkage assembly 36 has been illustrated, it will be appreciated by those of ordinary skill in the art that there are a wide variety of ways to interconnect the vanes 18**.

Electrical power may be supplied to control assembly 26 in a conventional manner using separate photovoltaic power supplies (not shown) mounted to the skylight side 25 of the vane support frame 16 so as to face outwardly to receive incoming, incident sunlight.

Figure 5:
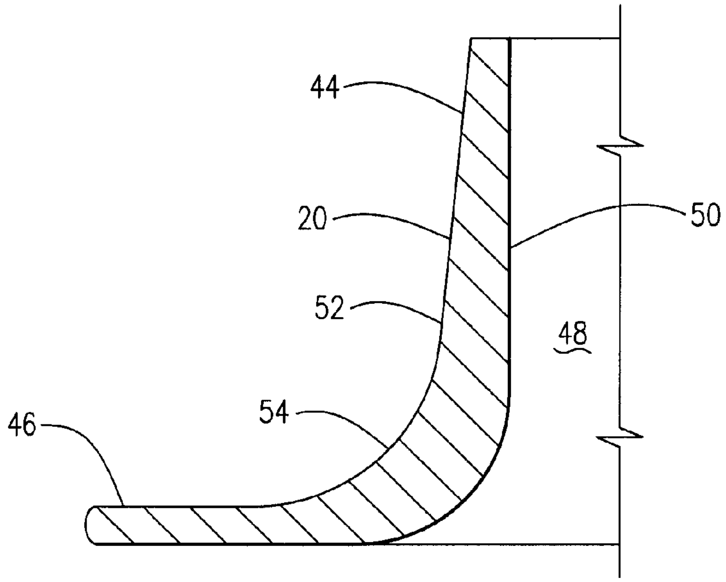
FIG. 5 is a cross-sectional view of a light deflecting member of the energy control apparatus.

In a preferred embodiment, the skylight 12 is constructed of a transparent material thereby enabling the first light sensor 22 to accurately detect the level of incident solar radiation. Because the skylight 12 is transparent, the light deflecting member 20 may be used to diffuse the unfiltered solar radiation. As shown in FIGS. 1, 2, and 5, the light deflecting member 20 preferably includes a vertical tubular wall portion 44 and a horizontal flanged portion 46. The tubular portion 44 defines a vertical passage 48 and has an inner surface 50 and an outer surface 52. The tubular portion 44 is shown to have a rectangular shape. However, it should be appreciated that the tubular portion 44 may be constructed in a variety of shapes (e.g., square, triangle, circle, hexagon). Also, the tubular portion 44 may be constructed of more than one piece and the pieces may be positioned below the vanes 18 in a spaced apart relationship depending on the amount of light desired to be reflected. The flanged portion 46 extends a distance outwardly from a lower end of the tubular portion 44 and preferably extends about the entire perimeter of the tubular portion 44.

The light deflector member 20 is positioned below the vanes 18 a selected distance so as to cause a portion of the light that passes through the vanes 18 to be reflected toward the ceiling of the structure 14 where the ceiling functions to diffuse the light further, while allowing a portion of the light to pass through the passage 48 of the light deflecting member 20 and toward the floor of the structure 14. More specifically, the outer surface 52 of the tubular portion 44 and the flanged portion 46 function to reflect light that passes to the exterior side of the tubular portion 44 toward the ceiling of the structure 14. To this end, it will be appreciated that the dimensions of the tubular portion 44 and the flanged portion 46 may be varied depending on the amount of light desired to be reflected to the ceiling. To further facilitate the reflection of light toward the ceiling, a transition zone 54 between the tubular portion 44 and the flanged portion 46 is preferably arcuate shaped. The light deflector member 20 may be secured in relation to the vanes 18 in any suitable manner. For example, the light deflecting member 20 may be suspended from the vane support frame 16, or the light deflecting member 20 may be mounted to the roof support structure of the structure 14.

From the above description, it is clear that the present invention is well adapted to carry out the objects and to attain the advantages mentioned herein, as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An apparatus for controlling energy from a skylight of a structure, the structure having a ceiling and a floor, the apparatus comprising:

a plurality of vanes positionable beneath the skylight and angularly adjustable to control solar radiation entering the structure through the skylight, the vanes having a skylight side and a structure side, and the vanes having a first continuously smooth, S-shaped surface extending from one end of the vane to an opposite end of the vane and a second continuously smooth, S-shaped surface extending from the end of the vane to the opposing end of the vane;

a first light sensor disposed proximate the skylight side of the vanes for providing a signal over time representative of changing incident solar radiation at the skylight side of the vanes;

a second light sensor disposed proximate the structure side of the vanes for providing a signal over time representative of changing incident solar radiation at the structure side of the vanes; and means operably connected to the vanes for automatically controlling the angle of each of the vanes in response to the signals of the first and second light sensors which signals vary due to changes in incident solar radiation over time.

2. The apparatus of claim 1 further comprising:

a vane support frame to which the vanes are rotatably connected; and a light deflecting member positionable in alignment with the skylight and in a downwardly spaced relationship with respect to the vanes, the vane support frame, and the ceiling a selected distance so as to cause a first portion of the light that passes through the vanes to be reflected toward the ceiling of the structure and a second portion of the light to pass directly toward the floor of the structure.

3. The apparatus of claim 2 wherein the light deflecting member includes a vertical wall portion and a horizontal flanged portion, the horizontal flanged portion extending a distance outwardly from a lower end of the vertical wall portion.

4. The apparatus of claim 2 wherein the light deflecting member has a vertical tubular portion and a horizontal flanged portion, the tubular portion defining a passage, the flanged portion extending a distance outwardly from a lower end of the tubular portion.

5. The apparatus of claim 4 wherein the flanged portion extends about the entire perimeter of the tubular portion.

6. A kit for controlling energy from a skylight of a structure, the structure having a ceiling and a floor, the apparatus comprising:

a vane support frame;

a plurality of vanes rotatably connected to the vane support frame so that the vanes are positionable beneath the skylight and angularly adjustable to control solar radiation entering the structure through the skylight, the vanes having a skylight side and a structure side;

a first light sensor disposed proximate the skylight side of the vanes for providing a signal over time representative of changing incident solar radiation at the skylight side of the vanes;

a second light sensor disposed proximate the structure side of the vanes for providing a signal over time representative of changing incident solar radiation at the structure side of the vanes;

means operably connected to the vanes for automatically controlling the angle of each of the vanes in response to the signals of the first and second light sensors which signals vary due to changes in incident solar radiation over time; and a light deflecting member mountable in alignment with the skylight and in a downwardly spaced relationship with respect to the vanes, the vane support frame, and the ceiling so as to cause a first portion of the light that passes through the vanes to be reflected toward the ceiling of the structure and a second portion of the light to pass directly toward the floor of the structure.

7. The kit of claim 6 wherein the light deflecting member includes a vertical wall portion and a horizontal flanged portion, the horizontal flanged portion extending a distance outwardly from a lower end of the vertical wall portion.

8. The apparatus of claim 6 wherein the light deflecting member has a vertical tubular portion and a horizontal flanged portion, the tubular portion defining a passage, the flanged portion extending a distance outwardly from a lower end of the tubular portion.

9. The apparatus of claim 8 wherein the flanged portion extends about the entire perimeter of the tubular portion.

10. An apparatus in combination with a skylight formed through a roof of a structure for controlling energy entering the structure through the skylight, the structure having a ceiling and a floor, the apparatus comprising:

a plurality of vanes disposed beneath the skylight and angularly adjustable to control solar radiation entering the structure through the skylight, the vanes having a skylight side and a structure side, and the vanes having a first continuously smooth, S-shaped surface extending from one end of the vane to an opposite end of the vane and a second continuously smooth, S-shaped surface extending from the end of the vane to the opposing end of the vane;

a first light sensor disposed proximate the skylight side of the vanes for providing a signal over time representative of changing incident solar radiation at the skylight side of the vanes;

a second light sensor disposed proximate the structure side of the vanes for providing a signal over time representative of changing incident solar radiation at the structure side of the vanes; and means operably connected to the vanes for automatically controlling the angle of each of the vanes in response to the signals of the first and second light sensors which signals vary due to changes in incident solar radiation over time.

11. The combination of claim 10 wherein the apparatus further comprises:

a vane support frame to which the vanes are rotatably connected; and a light deflecting member positionable in alignment with the skylight and in a downwardly spaced relationship with respect to the vanes, the vane support frame, and the ceiling a selected distance so as to cause a first portion of the light that passes through the vanes to be reflected toward the ceiling of the structure and a second portion of the light to pass directly toward the floor of the structure.

12. The combination of claim 11 wherein the light deflecting member includes a vertical wall portion and a horizontal flanged portion, the horizontal flanged portion extending a distance outwardly from a lower end of the vertical wall portion.

13. The combination of claim 11 wherein the light deflecting member has a vertical tubular portion and a horizontal flanged portion, the tubular portion defining a passage, the flanged portion extending a distance outwardly from a lower end of the tubular portion.

14. The combination of claim 13 wherein the flanged portion extends about the entire perimeter of the tubular portion.

15. An apparatus in combination with a skylight formed through a roof of a structure for controlling energy entering the structure through the skylight, the structure having a ceiling and a floor, the apparatus comprising:

a vane support frame;

a plurality of vanes rotatably connected to the vane support frame so that the vanes are positionable beneath the skylight and angularly adjustable to control solar radiation entering the structure through the skylight, the vanes having a skylight side and a structure side;

a first light sensor disposed proximate the skylight side of the vanes for providing a signal over time representative of changing incident solar radiation at the skylight side of the vanes;

a second light sensor disposed proximate the structure side of the vanes for providing a signal over time representative of changing incident solar radiation at the structure side of the vanes;

means operably connected to the vanes for automatically controlling the angle of each of the vanes in response to the signals of the first and second light sensors which signals vary due to changes in incident solar radiation over time; and a light deflecting member mountable in alignment with the skylight and in a downwardly spaced relationship with respect to the vanes, the vane support frame, and the ceiling so as to cause a first portion of the light that passes through the vanes to be reflected toward the ceiling of the structure and a second portion of the light to pass directly toward the floor of the structure.

16. The combination of claim 15 wherein the light deflecting member includes a vertical wall portion and a horizontal flanged portion, the horizontal flanged portion extending a distance outwardly from a lower end of the vertical wall portion.

17. The combination of claim 15 wherein the light deflecting member has a vertical tubular portion and a horizontal flanged portion, the tubular portion defining a passage, the flanged portion extending a distance outwardly from a lower end of the tubular portion.

18. The combination of claim 17 wherein the flanged portion extends about the entire perimeter of the tubular portion.

* * * * *